Nov. 23, 1937.  V. SEIDELHUBER  2,099,772

PELORUS

Filed Feb. 15, 1937  2 Sheets-Sheet 1

Inventor
Victor Seidelhuber
By Charles L. Reynolds
Attorney

Patented Nov. 23, 1937

2,099,772

UNITED STATES PATENT OFFICE 2,099,772

PELORUS

Victor Seidelhuber, Seattle, Wash., assignor of one-half to Frank V. Seidelhuber, Seattle, Wash.

Application February 15, 1937, Serial No. 125,765

13 Claims. (Cl. 33—72)

My invention relates to a pelorus of the portable type, by means of which a navigator may take sights on landmarks, and by the intersection of the plotted lines of sight can determine his position with accuracy.

Such devices, as heretofore used, have embodied sight vanes rotatable about the center of the compass card, with an indicator to point out the bearing for any given sight, but it was necessary for the navigator to take his sight, observe the bearing thus determined, remember it or stop to record it, then take a second sight and similarly determine its bearing, and remember or record it, and so on with additional sights, if more than two sights are taken, which usually is the case in inland waters. If the vessel is traveling at any appreciable speed and the landmarks are reasonably close, and therefore are changing rapidly in their bearings, the time required to observe each bearing and to record it, if it was recorded, introduced an error, as the vessel made a certain run between each such sight, and as a result the exact position of the vessel could not be plotted with accuracy, and even a small error thus introduced might be dangerous in waters where rocks or reefs or shallows are to be found. This time might be cut down by remembering the individual bearings, but still time was required in observing each bearing, and in addition there was the ever-present possibility of incorrectly observing or remembering the bearings.

In aerial navigation the speed of the airplane is measured in hundreds of feet per second, and the navigator must be able to take two or more bearings with the utmost rapidity, if he desires an accurate check on his position.

It is the object of the present invention to avoid the difficulties referred to, and to provide, in a pelorus, a device for indicating precisely each bearing as it is taken, without the necessity of taking the time to observe the bearing, but rather leaving a mark on the compass card to indicate the bearing, this mark being later erased, and thus speeding up the taking of the bearings and requiring only the time to bring the sight vanes to bear upon the selected landmark, thereby cutting down the run of the ship or airplane between bearings, and the likelihood of error or inaccuracy.

It is a further object to provide a pelorus having the advantages above, which is of simple construction and thoroughly reliable in operation, and which can be operated conveniently by either hand alone, or by two hands, as may be preferred by the navigator.

It is a further object to provide such a pelorus which can be adjusted for taking bearings on a true course or on a magnetic course, or otherwise, as desired, and one having the capability of taking standard bearings to determine the speed of the ship, and which in all ways is capable of doing all the things required of a pelorus, and in addition having the advantages explained above.

My invention comprises the novel parts and the novel combination and arrangement of the same in a pelorus, all as shown in the accompanying drawings, and as will be hereinafter more particularly described and defined in the claims which terminate this specification.

In the accompanying drawings I have shown my invention embodied in a form which is at present preferred by me.

Figure 1:
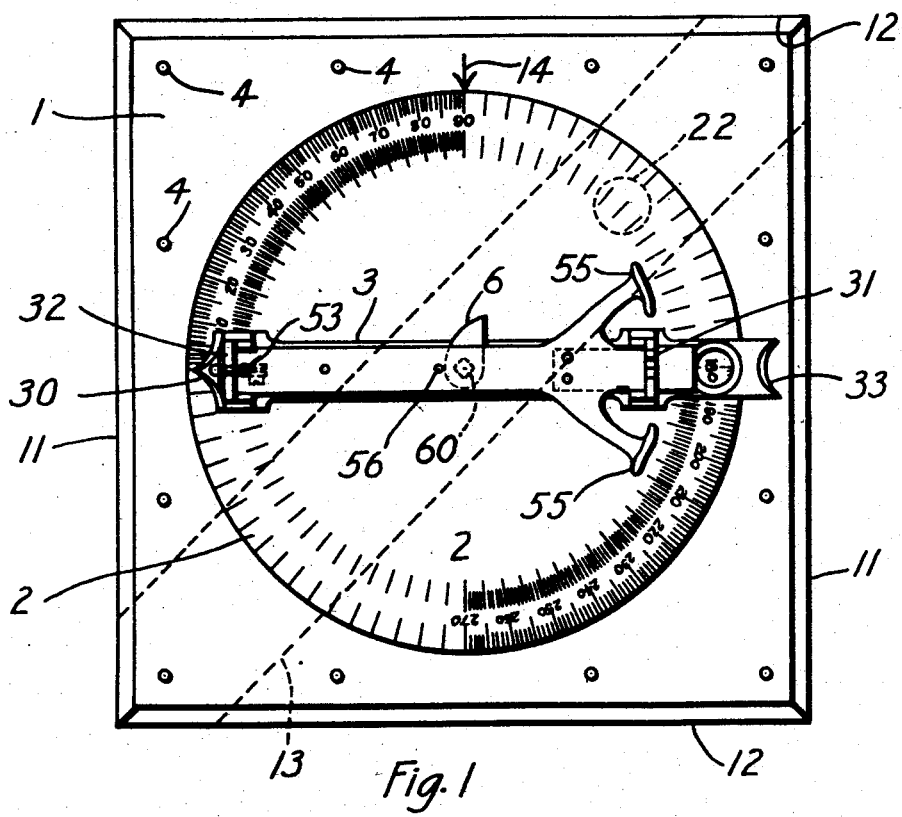
Figure 1 is a plan view of my pelorus.
Figures 3, 4:
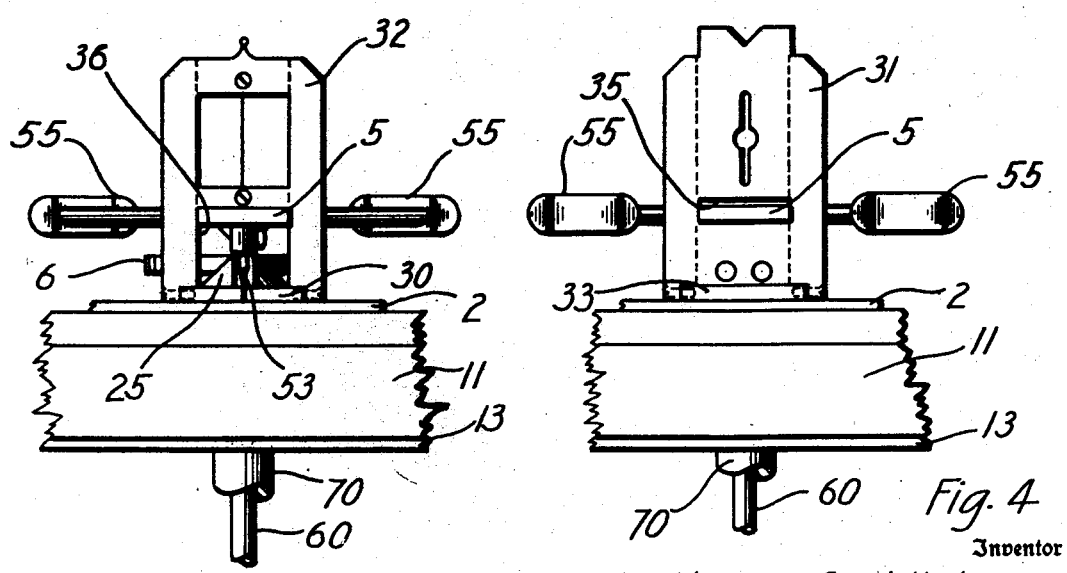
Figure 3 is an elevation of one of the sight vanes and associated parts.
Figure 4 is a similar elevation of the other sight vane and its associated parts.

The pelorus may be considered as comprising the square base 1, the edges 11 and 12 of which are adapted to be placed against chart house windows, for example, which are parallel to or which extend transversely of the keel; a compass card 2 is mounted upon this base 1, and a sight bar 3 is rotatable about the center of the compass card, and carries the sight vanes 31 and 32. A pointer 30 on one end of the sight vane cooperates with the compass card to indicate visually the observed bearing, if the navigator wishes to observe it in this way. A concavity 33 on the opposite end may be engaged by a finger to rotate the sight bar about the axis of the compass card.

In order that the pelorus may be adjusted for true bearings or for magnetic bearings, or otherwise, it is preferred that the compass card 2 be not secured directly to the base 1, but upon a disk or table 20, which is rotatable with respect to the rectangular base 1. Their corresponding edges may be rabbeted, as indicated at 21, and the disk 20, to which the compass card 2 is secured, may be supported by a bridge member 13 secured at its ends to the base and extending diametrically beneath the disk 20. In order to secure the disk 20 and the compass card 2 in any adjusted position a set screw 22 may be received in a nut or threaded sleeve 23 secured to the bridge member 13, and this, acting as a set screw pressing against the under side of the disk 20, will hold parts in any adjusted position with respect to the index 14.

For taking standard bearings the pins 4 are provided, these being located at the usual angular distances upon the base 1.

Thus far the pelorus need not differ materially from any previously known form of pelorus, except that the compass card 2 has a surface which can receive a pencil mark and from which the pencil marks can be erased. It may be of nickel-silver, for example, unpolished or even slightly roughened.

Figure 2:
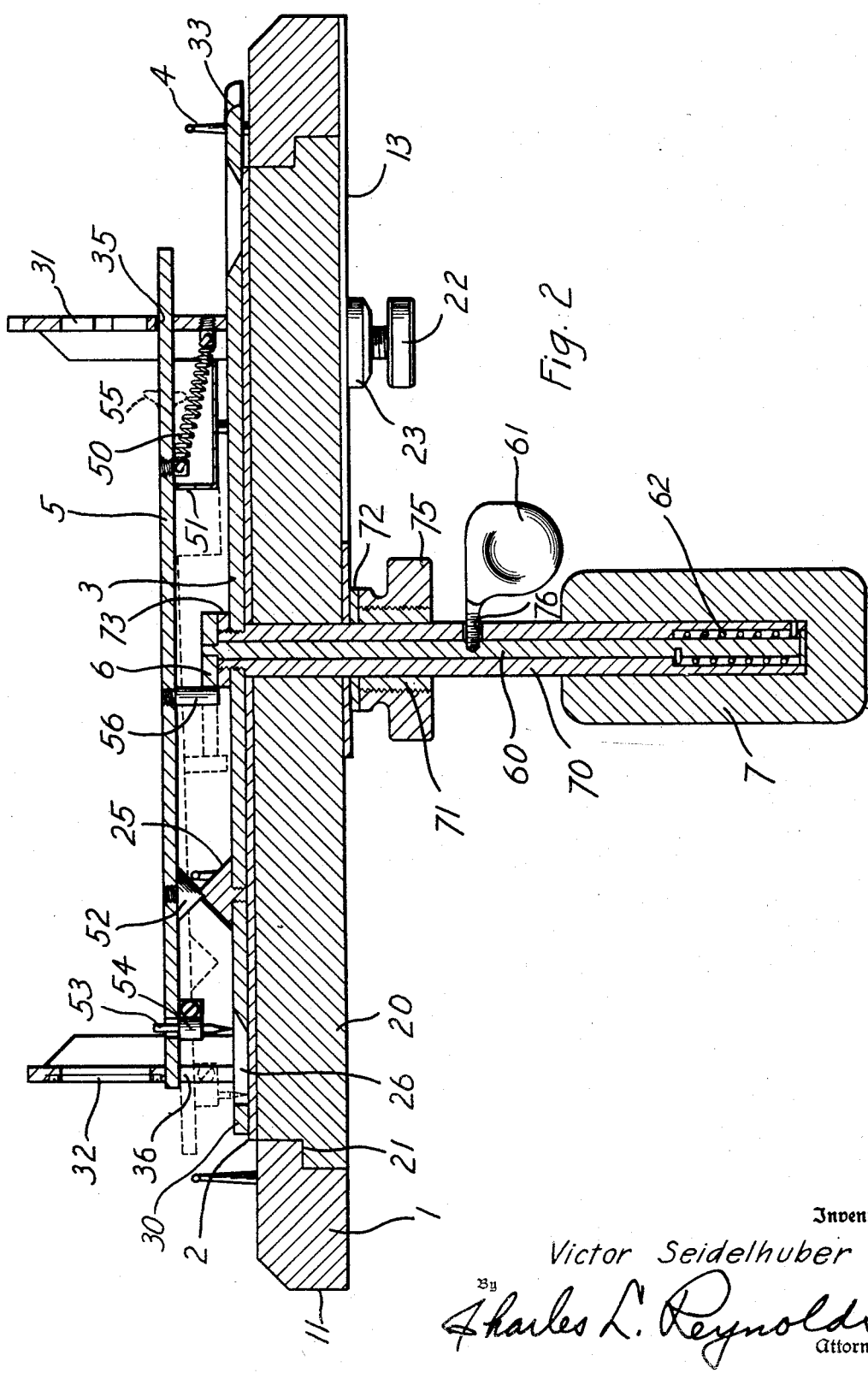
Figure 2 is an axial section through the pelorus taken along the length of the sight bar.

Carried by the sight vanes 31 and 32, or otherwise supported from the sight bar 3, is a pencil bar 5 which is supported and guided in the two sight vanes to rotate with them and to move lengthwise of the sight bar 3, but not transversely with respect thereto. At one end it may be received, for example, in a transverse slot 35 in the sight vane 31, and its opposite end may be guided for longitudinal and vertical movement in an opening 36 in the sight vane 32. Thus the pencil bar 5 can rock from the full line position of Figure 2 to the dash line position thereof, but is normally held in the full line position by means of a tension spring 50 extending from the pencil bar 5 downwardly and toward the sight vane 31. A box 51 may enclose this spring to prevent its catching, and to improve the appearance of the device. This spring, pulling to the right, as seen in Figure 2, acts upon the pencil bar 5 to draw it to the right, thereby causing a cone 52, carried on its under side, to ride upward on a similarly coned or inclined member 25, carried by the sight bar 3, and the member 22 may be grooved to guide the point of the cone 52, and may have a slight depression at its apex so that the cone 52 will not accidentally ride down the incline of the cone 25. A pencil or marking tip 53, held in a suitable clamp 54 carried by the pencil bar, is thus normally held upraised, with parts in the full line position of Figure 2, but upon moving the pencil bar 5 to the left in opposition to the spring 50, as seen in Figure 2, the tip of the pencil is drawn down by the downward component of the inclined spring, and engages the surface of the compass card 2 through an aperture 26 left in the sight bar. Since the pencil 53 lies in the line of sight from 31 to 32, it makes a mark in this line of sight, thereby indicating graphically upon the surface of the compass card the bearing at which the marking was made.

Such movement of the pencil bar may be accomplished by finger buttons 55 formed on the pencil bar, or by a cam-like element which will now be described. This cam 6 is secured upon the end of a rod or post 60, the upper end of this post being squared and received in a squared hole in the cam, or the cam being otherwise held against rotation relative to the rod, and the cam, disposed above the sight bar 3 and below the pencil bar 5, engages a pin 56 which is secured in the pencil bar. The rod 60 is received in a sleeve 70, which sleeve is guided for rotation in the bridge member 13 and disk 20, and the upper end of the sleeve 70 is clamped to the sight bar 3, by suitable means such as the nut 73. By means of a handle 7 upon the lower end of the sleeve 70 the entire pelorus may be supported, and the sight bar 3 may be rotated from one position to another, the base 1 being held against rotation by hand or its engagement with a chart house window. To assist in the support of the pelorus from the handle 7 and sleeve 70 the sleeve is shouldered, or has secured upon it a threaded enlargement 71, which, through a washer 72, bears beneath the bridge member 13, and a nut 75, received on the threaded enlargement 71, serves to clamp the sight bar 3 down against the upper surface of the compass card, thereby fixing it in position when this is desired. When the nut 75 is slacked off, however, the sight bar 3 is free to be rotated by rotation of the handle 7 and sleeve 70 with respect to the disk 20. This disk, during the time of taking any bearing, is held in fixed position with relation to the base 1 by means of the set screw 22, previously referred to. A torsion spring 62, reacting between the rod 60 and sleeve 70, may be employed, if desired, to maintain the cam fixed normally in the full line position of Figure 2 and as shown in Figure 1, but when it is desired to indicate any observed bearing, with the pelorus held by the handle 7, it is only necessary to oscillate the rod 60, for instance by the finger-piece 61 moving in a circumferential slot 76 in the sleeve 70, and this moves the cam 6 to the dash line position of Figure 2, thereby effecting longitudinal movement of the pencil bar 5, and in consequence the engagement of the pencil 53 with the surface of the compass card. The finger-piece 61 can be moved by the thumb of the hand which grasps the handle 7.

It is thus possible to hold the pelorus, with the sight vanes in the line of sight, and when a bearing is obtained, immediately move the finger-piece 61 to record that bearing. The sight bar can then be swung to a new bearing, the second bearing recorded again in the same way, and so on, until the required number of bearings have been taken, and all such bearings can be taken and recorded accurately as quickly as the sight vanes can be brought to bear on the desired landmark.

It may be preferable, in some cases, to omit the depending handle 7, so that the pelorus may be mounted upon a standard compass. In such a structure the movement of the pencil bar is accomplished solely by means of the handles 55.

What I claim as my invention is:

1. In a pelorus, in combination with the compass card and a pair of diametrically disposed sight vanes rotatable over said compass card, means associated and movable with said sight vanes, and normally held in inoperative position, but guided for movement at will to mark the compass card to indicate any given sight bearing.

2. In a pelorus, in combination with the compass card and a pair of diametrically disposed sight vanes rotatable over said compass card, a pencil rotatable with the sight vanes, means normally holding the pencil above the compass card, out of marking position, and means to move the pencil at will into marking engagement with the compass card, in the line of sight, thus to indicate graphically the bearing of any selected sight.

3. In a pelorus, in combination with the compass card, a sight bar rotatable over said compass card, including a pair of cooperating sight vanes carried by said bar, a pencil disposed in the line of sight, normally above the compass card, a pencil bar supporting said pencil and supported by said sight bar for movement lengthwise of the latter, and also for movement of the pencil towards and from the compass card, and means so to move the pencil bar in any position to which it is rotated with the sight bar.

4. In a pelorus, in combination with the compass card, a sight bar rotatable over said compass card, including a pair of cooperating sight vanes carried by said bar, a pencil disposed in the line of sight, normally above the compass card, a pencil bar supporting said pencil and supported by said sight bar for movement lengthwise of the latter, and also for movement of the pencil towards and from the compass card, means to rotate the sight bar, and, with it, the pencil bar, and means to move the pencil into marking engagement with the compass card, located for operation by the same hand which rotates the sight bar, when in position so to rotate it.

5. In a pelorus, in combination with a compass card, a sight bar including a pair of sight vanes rotatable over the compass card, a handle to support the pelorus, and engaged with the sight bar to rotate the latter, a pencil associated with the sight bar and normally held inoperative above the compass card, and means associated with said handle to move the pencil, at will, into marking engagement with the compass card.

6. In a pelorus, in combination with a compass card, a sight bar including a pair of sight vanes rotatable over the compass card, a handle below the compass card to support the pelorus, and engaged with the sight bar to rotate the latter, a pencil bar supported by and rotatable with the sight bar, a pencil carried thereby and disposed in the line of sight, means normally holding the pencil upraised above the compass card, and means disposed conveniently for operation by the hand which supports said handle, to move the pencil bar into marking engagement with the compass card.

7. In a pelorus, in combination with a compass card, a diametrically disposed sight bar, including a pair of upright sight vanes, rotatable over the compass card, a pencil bar extending lengthwise of the sight bar, and the sight vanes having holes wherein the pencil bar is guided to prevent transverse movement, but is permitted lengthwise and rocking movement, a pencil carried by the pencil bar, above the compass card, an incline and a spring cooperating between the sight bar and the pencil bar to hold the pencil elevated, and means cooperating with the pencil bar to move it lengthwise, and down the incline to cause the pencil to mark the compass card in any sighting position of the sight bar.

8. In a pelorus, in combination with a compass card, a sight bar including a pair of sight vanes rotatable over the compass card, a handle, a sleeve carried thereby, having a shoulder below the compass card to support the pelorus, and extending through the compass card for engagement with the sight bar to rotate the latter, a rod oscillatable within the sleeve, a finger-piece carried by the rod, adjacent the handle, for oscillation of the rod at will, a pencil bar extending parallel to and rotatable with the sight bar, a pencil carried by the pencil bar and engageable with the compass card to mark the latter, means normally holding the pencil in inoperative position, and means operatively engaged by said rod, when it is oscillated, to move the pencil bar and pencil to mark the compass card with the latter.

9. In a pelorus, in combination with the compass card and a sight bar, including a pair of sight vanes, rotatable over the compass card, a base having square edges, the compass card being angularly adjustable relative to the base, and means rotatable with the sight bar, and operable at will in any rotated position of the latter, to mark the compass card in the line of sight.

10. In a pelorus, in combination with the compass card, a shouldered sleeve extending axially through and rotatable with respect to the compass card, the shoulder on said sleeve supportingly engaging beneath the compass card, a sight bar secured to the upper end of said sleeve, to rotate therewith, a handle on the lower end of said sleeve, a rod oscillatable within said sleeve, a pencil bar supported from and rotatable with said sight bar, a pencil carried thereby, means normally holding said pencil above the compass card, in the line of sight, and means carried by said rod, and operable by oscillation thereof relative to the sleeve, to engage the pencil with the compass card, to mark a given sight bearing.

11. In a pelorus, in combination with the compass card and a pair of diametrically disposed sight vanes rotatable over said compass card, a marking device rotatable with the sight vanes and disposed in the line of sight, in position to mark the compass card, and supported for movement at will along the line of sight to indicate on the compass card any given sight.

12. In a pelorus, in combination with the compass card, a marking device supported for rotation over the compass card in a position to mark the same, and further supported for movement radially of the compass card, a pair of rotatable sight vanes, and an operative connection between the sight vanes and the marking device, to effect rotative movement of the latter in accordance with rotative movement of the sight vanes as they come to bear upon a given landmark.

13. In a pelorus, in combination with a compass card, a sight bar including a pair of sight vanes rotatable over the compass card, a pencil supported from and rotative with the sight bar and normally held inoperative above the compass card, and means operable at will to move the pencil into marking engagement with the compass card.

VICTOR SEIDELHUBER.